United States Patent [19]

Lin

[11] Patent Number: 4,848,466
[45] Date of Patent: Jul. 18, 1989

[54] ENHANCED OIL RECOVERY USING A THREE-STAGE INJECTION OF SOLVENT AND WATER

[75] Inventor: Eugene C. Lin, Yorba Linda, Calif.

[73] Assignee: Union Oil Company of California, Los Angeles, Calif.

[21] Appl. No.: 149,716

[22] Filed: Jan. 29, 1988

[51] Int. Cl.⁴ ............................................. E21B 43/70
[52] U.S. Cl. ..................................... 166/273; 166/274
[58] Field of Search .................... 166/273, 274, 275

[56] References Cited

U.S. PATENT DOCUMENTS

| | | | |
|---|---|---|---|
| 3,065,790 | 11/1962 | Holm | 166/273 |
| 3,207,217 | 9/1965 | Woertz | 166/273 |
| 3,249,157 | 5/1966 | Brigham et al. | 166/273 |
| 3,605,893 | 9/1971 | Dauber | 166/273 |
| 4,694,904 | 9/1987 | Sergul et al. | 166/252 |
| 4,709,759 | 12/1987 | Bock et al. | 166/275 |
| 4,711,304 | 12/1987 | Boeke et al. | 166/303 |
| 4,714,113 | 12/1987 | Mohrot et al. | 166/270 |

FOREIGN PATENT DOCUMENTS

| | | | |
|---|---|---|---|
| 825475 | 10/1969 | Canada | 166/273 |
| 1331681 | 5/1963 | France | 166/273 |

*Primary Examiner*—William P. Neuder
*Attorney, Agent, or Firm*—Gregory F. Wirzbicki; Howard Lambert; Walter A. Hackler

[57] ABSTRACT

A three-stage, hybrid solvent and water injection process is provided for the enhanced oil recovery from an oil-bearing formation. The three-stage process includes the sequential steps of: (i) injecting part of a selected total amount of solvent into the formation in a "single slug" injection stage, (ii) injecting the remainder of the total amount of solvent with water into the formation, in a water-alternating-gas (WAG) injection process, and (iii) injecting water into the formation until the water content in the produced mixture of oil and water reaches at least about 90 percent. The process includes deriving, for the selected total amount of solvent, a relationship between different first injection stage amounts of solvent and corresponding projected incremental oil recovery rates and selecting from such relationship the part of the solvent to be injected in the single slug injection stage. The preferred solvent is carbon dioxide, but such other solvents as liquid petroleum or natural gas may alternatively be used. The total amount of solvent is preferably less than about half the formation pore volume and the amount of solvent selected for the injection in the first stage is preferably less than about half of the total amount of solvent.

58 Claims, 2 Drawing Sheets

ENHANCED OIL RECOVERY USING A THREE-STAGE INJECTION OF SOLVENT AND WATER

BACKGROUND OF THE INVENTION

1. Field of the Invention

The present invention relates generally to crude oil production and, more particularly, to the enhanced (tertiary) recovery of crude oil, especially by the injection of a solvent—such as carbon dioxide, liquified petroleum gas (LPG), or liquified natural gas (LNG)—plus water into a subterranean formation from which the crude oil is to be recovered.

2. Background Discussion

Current estimates are that over two-thirds of the crude oil already discovered in the United States, and even greater amounts in the rest of the world, are unrecoverable by known primary and secondary (such as waterflood) crude oil production processes. This "unrecoverable" oil in the Unites States alone amounts to an estimated $3 \times 10^{11}$ barrels, the economical recoverability of even ten percent of which would more than double this Country's current reserves of producible crude oil.

In response to such factors as the disillusionment with nuclear power, the mid-East crises of the 1970's and the resulting dramatic increase in the cost of natural crude oil, and the rapidly dwindling reserves of readily-recoverable crude oil in the United States, considerable attention has been directed to developing effective and economical processes for the recovery of this "unrecoverable" oil so as to extend crude oil reserves. The recovery of such "unrecoverable" oil is commonly referred to as enhanced or tertiary oil recovery.

Many difficult problems are understandably associated with the enhanced recovery of crude oil, otherwise such oil would not be considered "unrecoverable." These enhanced oil recovery problems are due to such factors as the complex nature of fluid flow in underground reservoirs and the inability of producers to exercise control over the distribution and flow of fluids in the reservoirs. In this respect, underground reservoirs of crude oil typically consist of vast numbers of often small, interconnected pores and cracks in sandstone and carbonate rocks. Not only are single reservoirs typically composed of several or many different layers of rock having significantly different permeabilities, but the flow of fluid through the reservoir rocks is along a great many small, extremely tortuous and nonuniform channels and fissures which are interrupted by inclusions of shales, clays, and other materials. Thus a major problem is that when attempts are made to displace such oil by water or an expanding gas, the oil tends to be bypassed as the displacing fluid follows paths of lesser flow resistance.

Because of the large amounts of "unrecoverable" oil involved as compared with the usually much smaller amounts of oil which can be recovered by presently known primary and secondary recovery processes, a number of different enhanced oil recovery processes have been tried, with varying degrees of effectiveness. One of the most commonly used of these enhanced recovery processes is steam soaking, a process usually used for the recovery of high-viscosity oils, generally from shallow reservoirs in which the oil is at a relatively low temperature and pressure. Enhanced oil recovery rates by the use of steam soaking are, however, typically limited to no more than about 5 to 20 percent of the remaining oil in place, due primarily to the localized nature of the steam heating in the oil-producing formation and the usual inability of oil reservoirs to maintain a suitable rate of oil influx into the steam heated region around the steam injection boreholes.

The use of steam drive, as an alternative to steam heating, is generally somewhat more effective for enhanced oil recovery. However, a disadvantage is that such steam drive processes are ordinarily extremely energy intensive. For example, even for oils of normal viscosity, a third or more of the oil recovered by steam drive processes—or the energy equivalent thereof—is typically needed just to produce the driving steam used. for the enhanced recovery of higher viscosity oils by steam drive processes, the necessary steam generation can be expected to require the use of even greater percentages of the recovered oil.

Alternative fuels, such as coal and solar energy, have been suggested for generating the steam used in steam drive processes. So far, however, the proposed use of coal for producing the steam has not been practical, largely due to governmental regulations associated with the burning of coal. In turn, the proposed use of solar energy to produce the steam has not yet been proven feasible.

In another alternative enhanced oil recovery process, combustion gas generators are used to produce large volumes of hot, pressurized gas for injection into oil-bearing formations for oil heating and driving purposes. These gas generators are typically located at injection wellheads, but, in some cases, may be installed downhole so as to reduce heat and pressure losses in the gases. However, because of the difficulty in handling the hot, corrosive combustion gases and the large amounts of fuel required to generate useful quantities of combustion gases, the use of gas generators has not played an important role in enhanced oil recovery operations.

Thus, for significant amounts of "unrecoverable" oil, especially lighter oils, in the United States, the use of thermal processes, such as those mentioned above, for enhanced oil recovery has generally not been very satisfactory because of the low energy content of the recovered oil as compared to the large amount of heat energy required for heating the reservoir. This situation has naturally led to the search for more economically effective enhanced oil recovery processes; and the development of enhanced oil recovery processes involving liberation of oil through the reduction of the interfacial tension between the oil and water in the reservoir has proceeded as a less-costly alternative to energy-intensive, thermal processes. For such oil liberation purposes, drive fluids containing surfactants which reduce the interfacial tension to a low value and/or solutes which can dissolve in and swell the residual oil, so as to restore its mobility, have been used for the enhanced recovery of "unrecoverable" oil.

In laboratory oil production simulations, the capability for high-recovery yields of residual (non-recoverable) oil using aqueous solutions of micellar/polymeric surfactants with added polymers, such as polysaccharides and hydrolized polyacrylamides, has been demonstrated. Notwithstanding these promising laboratory results with the use of surfactants, when used in the field with actual oil formations, their high cost has ordinarily limited their usefulness. For one reason, the amounts of the oil-treatment materials used for enhanced oil recovery have usually been limited, because of their high cost, to no more than about 5 to 10 percent of the formation pore volume. At such low injection levels, especially considering the various material losses, absorptions, degradation, and so forth which occur, the amounts of oil recovered by the use of surfactants have usually not been particularly encouraging.

Regarding the use of solutes for enhanced oil recovery, the use of liquid petroleum gas (LPG) as a sacrificial solvent for such purpose—and even, in some cases, as an alternative to water in secondary reservoir flooding operations—was often practical when LPG was readily available and relatively inexpensive (compared to the cost of crude oil). Nevertheless, the efficiency of LPG in oil recovery operations is impaired by its mobility being much greater than that of crude oil and water. Consequently, LPG tends to finger through oil-bearing formations, with the result that usually only a small fraction of the residual oil can be recovered using LPG as an enhanced recovery solvent. Even in situations in which the low enhanced oil recovery by the use of LPG as a solvent might be otherwise acceptable, the increased cost of LPG makes its use as a recovery solvent unattractive.

Primarily because of the high cost of LPG as an enhanced oil recovery solvent, less costly oil-miscible solvents have been sought for enhanced oil recovery purposes. In this regard, carbon dioxide ($CO_2$), when under pressure, was known to be very soluble in most crude oils and its use in enhanced recovery operations was found to lead not only to a significant volumetric increase of the crude oil but also to an advantageous decrease in oil viscosity. As a result, the use of $CO_2$ as an injection fluid, which became popular in the 1970's, has now substantially supplanted the use of LPG in enhanced recovery operations, and accounts for at least about 85 percent of all solvents used for such operations.

Very large amounts of $CO_2$ are normally used in enhanced oil recovery operations, the amount being dependent upon the pore volume of the particular oil-bearing formation from which the oil is to be recovered and/or the amount of oil in place in the formation, as well as upon economic considerations which are more particularly discussed below. Typically, the amount of $CO_2$ solvent used for enhanced oil recovery is in the genera range of about 10 to about 30 percent of the formation pore volume. Because of the wide range of formation sizes and economic considerations, it is virtually impossible to define an "average" or "mean" amount of $CO_2$ solvent used in enhanced oil recovery operations; however, the injection of more than 100 billion cubic feet of $CO_2$ in such operations is not uncommon. Typically, the solvent injection operation continues for a number of years, with an injection time of 10–15 years not being uncommon.

Ordinarily the selected amount of $CO_2$ used for enhanced recovery of oil is injected into the oil-bearing formation either alone in a "single slug" injection operation or with water in a series of injection cycles in which the injection of $CO_2$ is alternated with the injection of water, the latter process being typically referred to as a water-alternating-gas (WAG) injection process. The simultaneous injection of a solvent and water, for example, by the use of separate solvent and water pumps, can be—and is herein—considered as being a WAG injection process using an infinite number of infinitesimally small injection cycles. Therefore, as used herein, the terms "WAG" injection process or "water-alternating-gas" injection process is to be construed broadly enough to include "cyclic" water and solvent injection in which the number of injection cycles may range from only a few, relatively long cycles to an infinite number of infinitesimally short cycles.

As is more particularly described below, given a particular total amount of solvent to be injected, a single slug injection process usually enables the recovery of more oil in the first few years after injection starts than does a WAG injection process. In contrast, a WAG process may, for some formations, enable the recovery of more oil 15-20 years after the start of injection, and may enable a greater overall oil recovery than would a single slug injection process which uses the same amount of solvent. However, a single slug injection process uses solvent at a faster rate than does a WAG injection process, and so early solvent costs are greater. Economic considerations are therefore important when deciding which of the two injection processes should be used for the enhanced recovery of oil from any particular oil-bearing formation.

U.S. Pat. No. 3,065,790 to Holm discloses an enhanced recovery process in which a high-pressure slug of $CO_2$ is injected into a "vuggy" limestone formation; thereafter, a drive fluid such as an aqueous solution of $CO_2$ is injected. After a given amount of $CO_2$ has been injected, it is disclosed that the system is shut in and pressure in the formation is gradually reduced to a substantially lowered pressure while oil continues to be produced from the formation.

Although $CO_2$ is usually a less-costly alternative to LPG for enhanced recovery operations, the cost of the very large amounts of $CO_2$ needed for useful enhanced oil recovery rates is by no means small. In fact, the cost of $CO_2$ used in enhanced recovery operations typically adds several dollars per barrel to the cost of the produced oil, thereby making tertiary oil economically unattractive as long as there exists an abundance—typically from foreign countries—of primary or secondary oil.

Considering the large amount of oil which can potentially be recovered by enhanced recovery operations and the large amount of solvents typically required for such oil recovery operations, the optimization of solvent injection processes is obviously important. It is, however, difficult, and probably impractical, to attempt to generalize regarding the selection of an "optimum" total amount of solvent to be used for enhanced oil recovery operations because of the great variation among different oil-bearing formations and the complicated, varied, and often unique economic considerations associated with each such formation. Moreover, the economic considerations involved tend to vary over time as economic circumstances and projections vary.

However, the determining of an optimum manner for injecting the solvent, once an injection amount hs been established for a particular formation, is considered by the present inventor more capable of generalization, and it is to such injection optimization that the present invention is primarily concerned.

SUMMARY OF THE INVENTION

According to the present invention, there is provided a three-stage, hybrid solvent and water injection process for the enhanced recovery of petroleum from an underground, oil-bearing formation to which there are drilled one or more fluid injection wells and one or more petroleum production wells. The present hybrid process for injecting a determined (or given) total amount of solvent (for example, carbon dioxide, liquid petroleum gas, liquid natural gas or mixtures thereof) into an oil-bearing formation comprises: (i) injecting an initial amount or fraction of the total amount of solvent by itself at a first solvent-injection rate; (ii) injecting the remainder of the total amount of solvent, along with water, preferably simultaneously or in short cycles of alternating solvent and water injection, into the formation at a second, average solvent-injection rate; and (iii) injecting water for a period of time or until after the concentration of water in the mixture of petroleum and water produced from the production well or wells reaches a particular or given level. Preferably the second, average solvent-injection rate is substantially less than the first solvent-injection rate.

In the preferred embodiment, the total amount (that is, the initial and remaining amounts) of the solvent to be injected in the hybrid injection process is equal to between about 10 percent and about 50 percent of the pore volume of the oil-bearing formation into which the solvent is to be injected for the enhanced oil recovery therefrom.

The proces of the present invention preferably includes deriving, for the determined (or given) total amount of solvent, a relationship between projected rates of oil recovery and different initial injection amounts or fractions of the total solvent amount followed by injecting the remainder of the solvent in an alternating manner with water. From this relationship, a particular, initial injection amount or fraction (or a range of amounts or fractions) of the total solvent amount is selected which is expected to provide a greater oil production than is projected for either injecting the total amount of the solvent in an entire single slug injection process or in a pure WAG injection process. It is preferred that the range of the initial injection amount of solvent be between about 5 percent and about 50 percent of the total amount of solvent determined or given for injection.

BRIEF DESCRIPTION OF THE DRAWINGS

The present invention can be more readily understood from a consideration of the following detailed description when taken in conjunction with the accompanying drawings in which:

FIG. 1 is a graph on which is plotted, for an exemplary oil formation, comparative curves of projected oil production rates, for a selected $CO_2$ total slug size of 0.20 PV, as a function of years after the start of $CO_2$ injection for: (i) a conventional, single $CO_2$ slug injection process; (ii) a conventional WAG $CO_2$ injection process; and (iii) a three-stage, hybrid (pre-WAG $CO_2$ slug injection followed by $CO_2$ plus water WAG injection) process according to the present invention in which the initial solvent injection slug size is equal to about 0.06 pore volumes (about 30 percent of the total solvent slug size); there being shown, for purposes of comparison, the projected extension of conventional waterflood, secondary oil recovery operations into the enhanced recovery period; also shown on the same time axis are relative annual $CO_2$ usages for the three different solvent injection processes;

DESCRIPTION OF THE PREFERRED EMBODIMENT

According to the present invention, there is provided a combined, sequential single slug, WAG, and water drive process for injecting a particular, total amount of a solvent into an oil-bearing formation for the enhanced recovery of crude oil therefrom. For convenience of description, this injection process is called a hybrid solvent injection process. The solvent selected for injection may advantageously be carbon dioxide ($CO_2$), liquid petroleum gas (LPG), liquified natural gas (LNG), or mixtures thereof. However, for purposes of describing the present invention, with no limitations being thereby intended or implied, the selected injection solvent is $CO_2$.

Although, in the oil and gas industry, solvent slug sizes are sometimes expressed in terms of fractions or percentages of oil in place (OIP), total solvent slug sizes are alternatively expressed herein as percentages of formation pore volume (PV), as is also common in the oil and gas industry. Also, as is generally understood, expressing any amount of solvent as a particular fraction or percentage of pore volume means the amount of solvent needed to fill the stated fraction or percentage of the formation pore volume at formation conditions, as opposed to wellhead conditions.

$CO_2$ is usually procured as a gas or based upon its volume as a gas. Therefore, if the $CO_2$ is highly compresed or in the liquid state at formation temperature and pressure, a much greater amount of $CO_2$ (as a gas or measured as a gas) must be procured in order for the $CO_2$ to fill the selected fraction or percentage of the formation pore volume. This is mentioned to underscore the fact that much more $CO_2$ is actually required than seems to be indicated and that procurement costs of the $CO_2$ are correspondingly greater than might otherwise be expected.

As is more particularly described below, the present hybrid solvent injection process for the enhanced recovery of oil utilizes a sequence of three injection stages or operations during which a determined or given total amount of $CO_2$ is injected into an oil-bearing formation over a long period of time. These three sequential injection stages or operations generally comprise the injection of: (i) an initial portion or percentage of the total amount of solvent, by itself, in a single slug injection process; (ii) the remainder of the total amount of solvent with water in a pure WAG (water-alternating-gas) injection process; and (iii) a water drive which is continued, along with oil production, for a period of time or until after the water content in the mixture of oil and water recovered from the formation reaches a particular percentage; for example, at least about 95 percent.

As mentioned above, the total amount (that is, the total slug size) of solvent to be injected into any particular oil-bearing formation, for the enhanced recovery of oil therefrom, depends upon many diverse and complex factors such as the pore volume (PV) of the oil formation, other formation characteristics (such as rock type and depth), oil characteristics (such as its viscosity), experience with similar oil-bearing formations, various economic considerations (such as present and projected future solvent and oil prices and projected oil recovery rates), and policy of the companies involved in the enhanced oil recovery operation.

When a total solvent slug size has been selected, determined, or given, procedures are available whereby, from measured and/or estimated formation and oil characteristics, projections of enhanced oil recovery can be made for any solvent slug size and for any manner of solvent injection. In this regard, a miscible flood simulator computer program useful for projecting oil recoveries is the "MULTIFLOOD" program which, with a User's Manual, is available from Todd, Deitrich and Chase, Inc.; Durango, Colo. and Houston, Tex. Both the MULTIFLOOD computer program and its User's Manual are incorporated hereinto in their entirety, for disclosure purposes, by specific reference.

Figure 1:
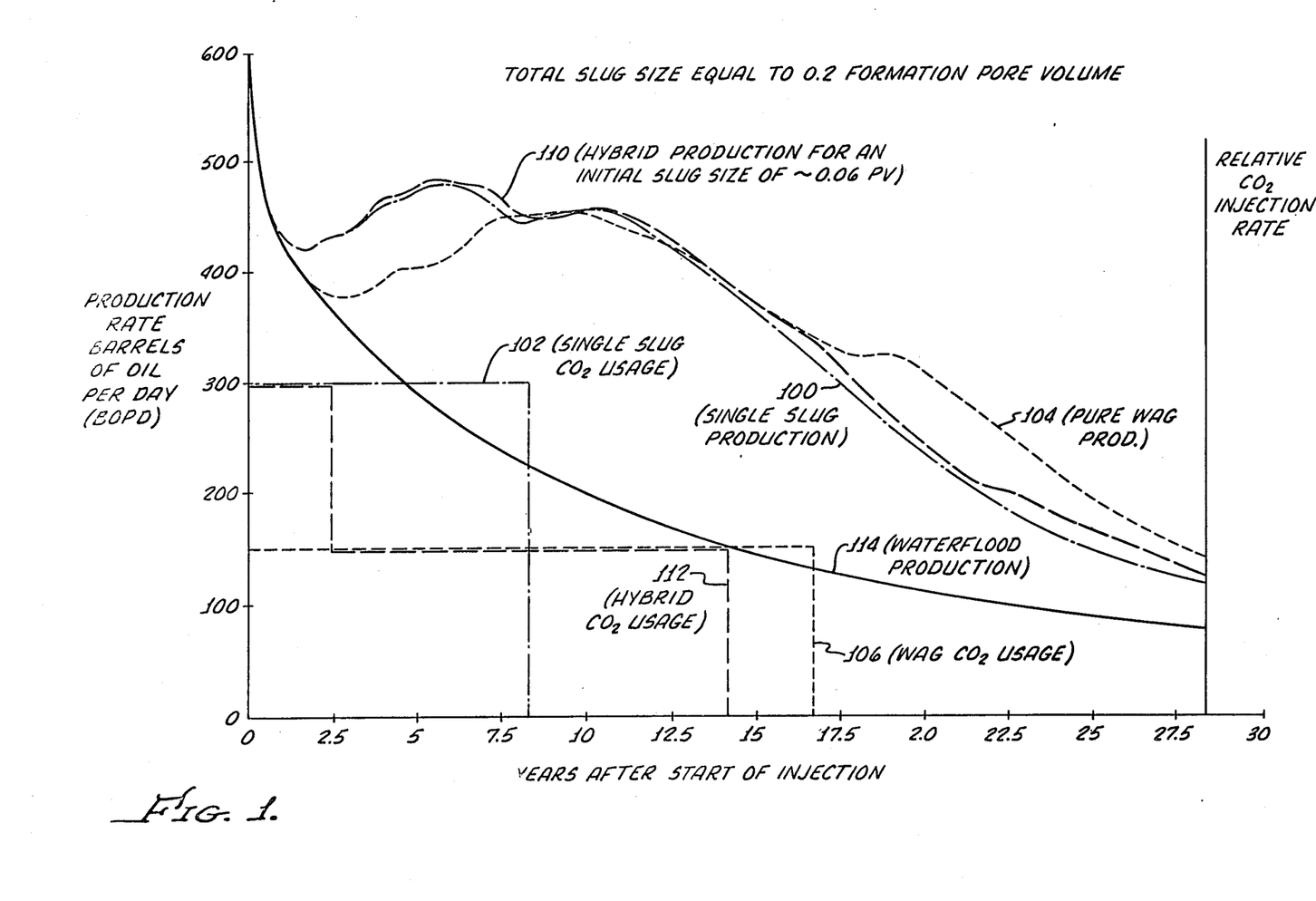

By way of example and to present additional relevant background, FIG. 1 shows the projected, enhanced oil recovery production rate (in barrels of oil per day) as a function of time for a particular, heterogeneous oil formation having four "five spot" injector-producer well patterns. The data used to plot the various production rate curves (discussed below) of FIG. 1 were obtained by the use of the above-identified MULTIFLOOD computer program using the appropriate oil and formation characteristics and assuming a total solvent slug size of about 0.2 formation pore volumes (PV) and that the solvent is $CO_2$.

Curve 100 of FIG. 1, depicts, for the exemplary formation, the projected daily oil production assuming that the total amount of $CO_2$ (that is, the total $CO_2$ slug size) is injected into the formation in a single slug process lasting about 8 years, followed thereafter by a water drive for a total injection time of about 30 years. A corresponding $CO_2$ usage curve 102 is also shown on FIG. 1. As might be expected, about a year after $CO_2$ injection starts and the $CO_2$ starts becoming effective, the oil production rate increases. After $CO_2$ injection ceases (actually about two years before injection ceases) the oil production declines at a relatively uniform rate for the remainder of the 30-year production period.

Another projected production rate curve 104, shown in FIG. 1, corresponds to injection of the 0.2 PV of $CO_2$ in a pure WAG injection process in which equal amounts of water and $CO_2$ are simultaneously injected. (As mentioned above, the term "WAG" is to be construed broadly enough to include the simultaneous injection of solvent and water, a process equivalent to an alternating injection process having an infinite number of injection cycles). For the WAG injection process, represented by curve 104, it is further assumed that the combined $CO_2$ and water injection rate is equal to the single slug injection rate associated with curve 100, the WAG $CO_2$ injection rate being half the $CO_2$ injection rate assumed for the single slug injection process represented by curve 100. A corresponding $CO_2$ usage curve 106 for the exemplary WAG injection process represented by curve 104 shows that, for the average $CO_2$ injection rate assumed, the $CO_2$ is injected over twice as long a time (about 16 years) as that associated with $CO_2$ injection in the single slug injection process (curve 102).

WAG production curve 104 shows that the increase in the projected oil production rate starts later and increases to a significantly lower level than the projected injection rate (curve 100) associated with the single slug injection. Respective single slug and WAG production rate curves 100 and 104 indicate that from about the tenth year to about the eighteenth year after the start of injection, the projected productions decrease at about the same rate for both processes. However, as shown by curve 106 for the particular formation represented, at about the eighteenth year, when the WAG injection process stops, there is about a two-year production rate plateau before the production rate starts decreasing again. (This is not necessaruly characteristic of all oil-bearing formations.) Considering the difference in the areas under single slug and WAG process production curves 100 and 104, for this particular formation, the WAG injection process is projected to produce somewhat more oil than the single slug process for the same amount of $CO_2$ injected.

More significantly, curves 100, 102, 104, and 106 indicate that the single slug process is projected to provide a substantially higher production rate in early years after $CO_2$ injection starts, but requires the injection of more $CO_2$ during this higher production rate period. In contrast, the WAG production benefit comes much later after the start of $CO_2$ injection, but the use—and hence the cost—of $CO_2$ is spread over twice as long an injection period. This principal difference between single slug injection and pure WAG injection processes is one of the factors taken into consideration in deciding upon the type of injection process to use.

The present inventor has investigated whether there may be some intermediate injection process which may provide the production benefits of the single slug injection process (curve 100) combined with the lower $CO_2$ usage rate of the pure WAG process (curve 106). From these investigations, the present inventor has discovered the advantageous three-stage, hybrid-injection process of the present invention.

As more particularly discussed below, curve 110 of FIG. 1 is the projected oil recovery rate curve associated with the present hybrid-injection process in which approximately 0.06 PV (out of the total of 0.2 PV) of $CO_2$ is injected in an initial "single" slug injection process. Thereafter, the remaining 0.14 PV of $CO_2$ is simultaneously injected with equal amounts of water in a "pure" WAG injection process (having an infinite number of injection cycles). Curve 112 shows the relative $CO_2$ usage associated with the present hybrid-injection process, assuming the $CO_2$ injection rates are the same as for the single slug and WAG injection processes represented, respectively, by $CO_2$ usage curves 102 and 106.

As can be seen from a comparison of respective single slug and hybrid-injection production curves 100 and 110, the hybrid-injection process is projected to provide about the same rate of oil production over the entire 30-year production period as does the single slug injection process. However, a comparison of single slug, pure WAG and hybrid-injection $CO_2$ usage-over-time curves 102, 106, and 112 shows that the $CO_2$ time-usage associated with the present hybrid-injection process much more closely matches $CO_2$ usage by the pure WAG injection process than by the single slug injection process. Thus, as compared to single slug injection processes using the same total amount of solvent, the present hybrid-injection process spreads solvent costs over a much longer time period.

A projected, secondary recovery waterflood production curve 114 is shown in FIG. 1 for comparative purposes. Waterflood curve 114 assumes the continuation of secondary recovery waterflood operations over the enhanced recovery period shown for curves 100, 104, and 110 without any enhanced recovery operations. As is apparent from comparing respective single slug injection, pure WAG injection, and the present hybrid-injection production curves 100, 104, and 110 with waterflood injection curve 114, each of the three enhanced recovery injection processes has a much greater projected oil recovery than does the continued waterflood process.

Figure 2:
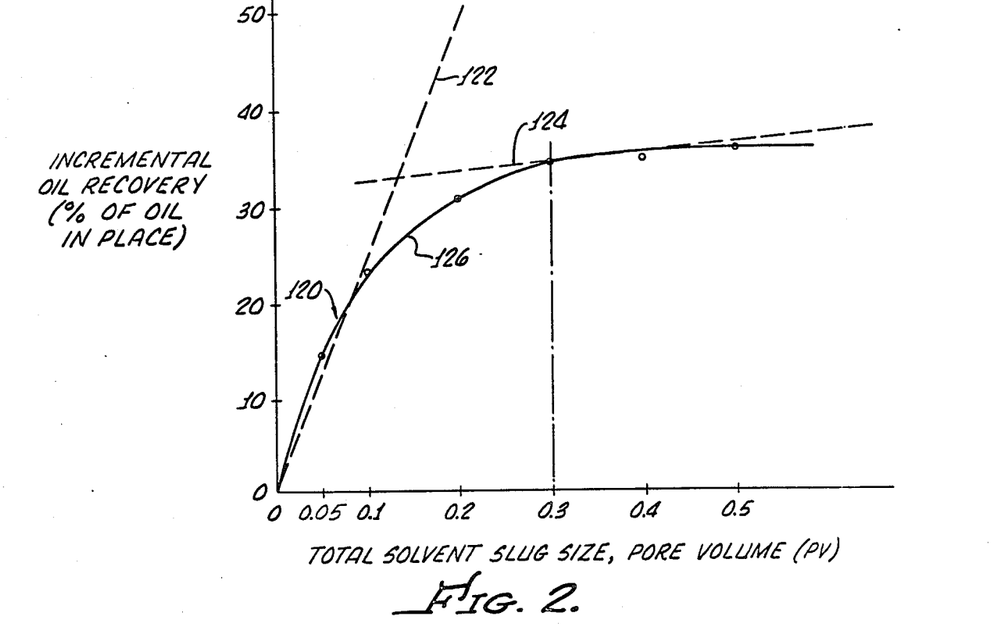
FIG. 2 is an exemplary graph on which is plotted projected incremental oil recovery as a function of total $CO_2$ slug size for single solvent slug injection and for simplified conditions in which a homogeneous formation is assumed, the oil recovery being shown as percentages of oil in place (OIP) and the solvent slug sizes being shown as decimal fractions of formation pore volume (PV)
Figure 3:
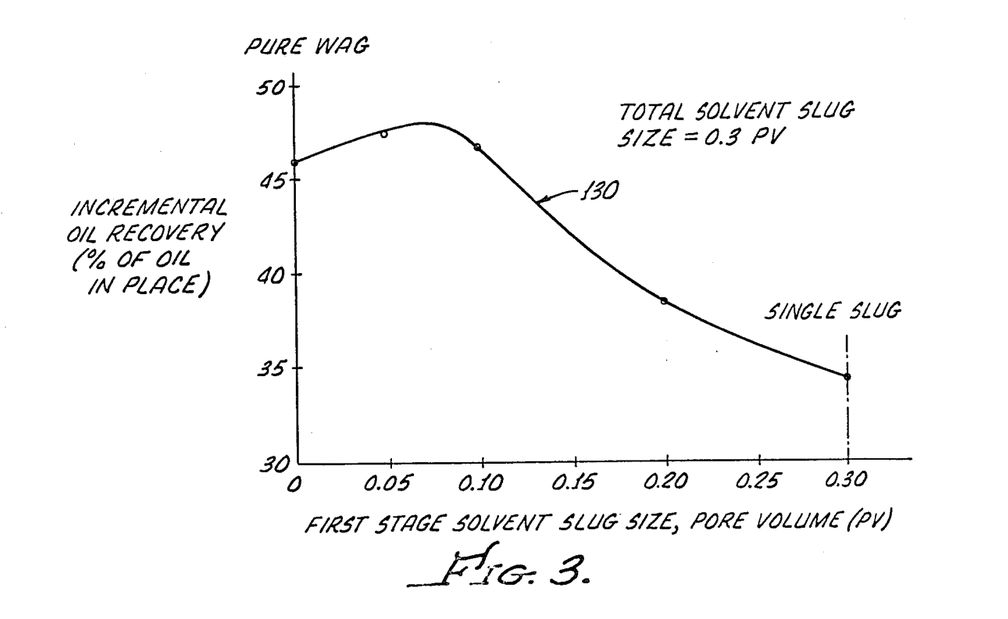
FIG. 3 is an exemplary graph on which is plotted projected incremental oil recovery as a function of initial (pre-WAG) $CO_2$ injection slug size (followed by WAG injection of the remainder of the solvent) for the same conditions assumed for the plot in FIG. 2 and for a total $CO_2$ slug size of 0.30 PV, the produced oil being shown as percentages of oil in place and the pre-WAG $CO_2$ injection slug sizes being shown as decimal fractions of the formation pore volume.

The manner of determining an appropriate initial $CO_2$ (or other solvent) slug size for injecting in the first stage of the present hybrid-injection process is illustrated in FIGS. 2 and 3 for an exemplary formation which is assumed, for simplification of computation, to be homogeneous. To this end, using the above-identified MULTIFLOOD computer program, a number of data points defining the relationship between incremental oil recovery and $CO_2$ solvent slug size (as a function of formation pore volume), for single slug injection, can be obtained. Such a relationship for the exemplary homogeneous formation is plotted in FIG. 2 as curve 120. A further assumption made in deriving data points for curve 120 is that single slug injection of the solvent is followed by water injection until a combined total of one pore volume of solvent and water has been injected.

It can be seen from curve 120 that (for the assumptions made) for $CO_2$ slug sizes up to about 0.1 pore volumes (PV) there is approximately a linear relationship between incremental oil production and solvent slug size, a relatively steep, straight line 122 being drawn, for convenience, through this region of the curve. Also, as shown in curve 120, for solvent slug sizes above about 0.3 PV, there is little production gain achieved by increasing solvent slug size. A nearly horizontal, straight line 124 can be drawn through the region of curve 120 above a slug size of about 0.3 PV. There remains on curve 120 a transition region 126 between lines 122 and 124; that is, between about 0.1 PV and about 0.3 PV.

Curve 120 indicates that a favorable $CO_2$ slug size, for the formation with which the curve is associated, would be in transition region 126, there being little economic incentive for selecting a slug size below about 0.1 PV or above about 0.3 PV. This is consistent with the selection of a solvent slug size of 0.2 for the curves of FIG. 1. However, based upon special economic considerations, a total solvent slug size outside of the 0.1 PV to 0.3 PV transition range shown on curve 120 may, of course, be selected.

Although the actual amount of incremental oil recovery, and, hence, curves corresponding to curve 120, can be expected to vary from formation to formation, the general shape of the curve is considered to be relatively typical of most oil-bearing formations for most types of commonly used enhanced oil recovery solvents, and for most types of injection. Therefore, in the absence of any other or better information, a total solvent slug size between about 0.1 PV and about 0.3 PV can advantageously be selected.

Curves similar to curve 120 of FIG. 2 can be useful in selecting a total solvent slug size to be injected into a formation for the enhanced oil recovery therefrom; however, such curves do not provide information regarding the optimum manner of injecting the selected (or given) total amount of solvent. As above discussed in relation to hybrid-injection curve 110 and associated solvent-usage curve 112 of FIG. 1, the present inventor has discovered that a solvent injection process in which part of the total amount of solvent is injected, essentially by itself, in a "single" solvent slug injection process, followed by the injection of the remainder of the solvent in a "pure" WAG injection process, has advantages over either the single slug or the pure WAG injection processes alone. Also, as above-described, the initial solvent slug size, upon which hybrid-injection production curve 110 (FIG. 1) is based, was selected as about 0.06 PV (out of a total solvent slug size of 0.2 PV).

The initial solvent slug size for the hybrid-injection process of the present invention can, however, be more precisely determined by deriving a relationship, such as is shown in curve 130 of FIG. 3, between incremental oil production and initial (first stage) solvent slug size. Data points for curve 130 are computed using the above-identified MULTIFLOOD computer program and are based on the assumptions: (i) a homogeneous formation, (ii) a total solvent slug size of 0.3 PV, (iii) an "infinite-cycle" WAG injection stage in which equal amounts of $CO_2$ and water are injected simultaneously and in which the combined $CO_2$ and water injection rates are equal to the first stage, single slug $CO_2$ injection rate, and (iv) injection of water after the WAG injection stage until a combined total of one pore volume of solvent and water has been injected.

It can be seen from curve 130 that, for the above-stated conditions, the incremental oil production peaks for an initial (first stage) solvent slug size between about 0.05 PV and about 0.10 PV. For the assumed total solvent slug size of 0.3 PV, this peak range amounts to between about 17 percent and about 33 percent of the total solvent slug size. Although incremental production rate vs. initial solvent slug size similar to curve 130 can be expected to vary for different conditions, it is expected that at least most such curves will have a peak relatively near the peak range shown. Therefore, taking into consideration formation differences, a peak range somewhere between about 0.03 PV and about 0.15 PV is reasonable to expect. In the absence of having data on a particular formation from which to plot a curve similar to curve 130, or in the absence of a well defined peak in a curve corresponding to curve 130, the selection of an initial slug size in the range of about 0.03 to about 0.15 should provide good enhanced oil recovery results, as is borne out by curve 110 of FIG. 1, for which an initial solvent slug size of about 0.06 was selected.

In essence, as can be seen by again referring to projected oil production and solvent-usage curves 100, 102, 104, 106, 110, and 112 of FIG. 1, the hybrid solvent injection process of the present invention combines the benefits of increased early oil production typically achieved by a single slug injection process with the benefit of deferred solvent costs typically associated with a pure WAG injection process. Accordingly, the present hybrid process, which preferably involves selecting a particular initial solvent slug size in the abovedescribed manner, offers important and attractive economic advantages over the use of either the single slug or pure WAG injection processes.

Although there has been described above a specific process for the injecting of a solvent in an enhanced oil recovery operation in order to illustrate the manner in which the present invention can be used to advantage, it is to be understood that the invention is not limited thereto. Accordingly, any and all variations or modifications which may occur to those skilled in the art are to be considered to be within the scope and spirit of the present invention as defined in the appended claims.

What is claimed is:

1. A solvent and water injection process for the enhanced recovery of oil from a natural underground, oil-bearing formation having one or more fluid injection wells and one or more petroleum production wells in communication therewith, the process comprising the steps of:
  (a) injecting into said formation, through said one or more injection wells and at a first, average solvent-injection rate, a fluid consisting essentially of an initial injection part of a total amount of solvent to be injected into the formation for the enhanced oil recovery of oil therefrom;
  (b) subsequently injecting into the formation, through said one or more injection wells and at a second, average solvent-injection rate, the remainder of said total amount of solvent with water, said second, average solvent-injection rate being substantially less than said first, average solvent-injection rate;
  (c) subsequently injecting water into the formation through said one or more injection wells; and
  (d) recovering oil from said one or more production wells.

2. The enhanced oil recovery process as claimed in claim 1 wherein the solvent is selected from the group consisting of carbon dioxide, liquified petroleum gas, liquified natural gas, and mixtures thereof.

3. The enhanced oil recovery process as claimed in claim 1 wherein the solvent consists essentially of carbon dioxide.

4. The enhanced oil recovery process as claimed in claim 1 wherein the step of injecting the remainder of solvent with water in step (b) comprises injecting the remainder of the solvent and water in a water-alternating-gas (WAG) injection process.

5. The enhanced oil recovery process as claimed in claim 1 wherein the step of injecting water in step (c) comprises injecting water until a mixture of water and oil is produced from said one or more production wells in step (d) and until or after the concentration of water in said mixture of oil and water reaches a particular level.

6. The enhanced oil recovery process as claimed in claim 1 wherein the step of injecting water in step (c) comprises injecting water for a particular time.

7. A solvent and water injection process for the enhanced recovery of oil from a natural underground, oil-bearing formation having one or more fluid injection wells and one or more petroleum production wells in communication therewith, the process comprising the steps of:
  (a) injecting into said formation, through said one or more injection wells and at a first, average solvent-injection rate, a fluid consisting essentially of an initial injection part of a total amount of solvent to be injected into the formation for the enhanced oil recovery of oil therefrom;
  (b) subsequently injecting into the formation, through said one or more injection wells and at a second, average solvent-injection rate, the remainder of said total amount of solvent with water in a water-alternating-gas (WAG) injection process in which the remainder of the solvent and the water are injected at substantially equal injection rates;
  (c) subsequently injecting water into the formation through said one or more injection wells; and
  (d) recovering oil from said one or more production wells.

8. The enhanced oil recovery process as claimed in claim 7 wherein the solvent is selected from the group consisting of carbon dioxide, liquified petroleum gas, liquified natural gas, and mixtures thereof.

9. The enhanced oil recovery process as claimed in claim 7 wherein the solvent consists essentially of carbon dioxide.

10. The enhanced oil recovery process as claimed in claim 7 wherein the second, average solvent-injection rate is substantially less than said first, average solvent-injection rate.

11. The enhanced oil recovery process as claimed in claim 7 wherein the step of injecting water in step (c) comprises injecting water until a mixture of water and oil is produced from said one or more production wells in step (d) and until or after the concentration of water in said mixture of oil and water reaches a particular level.

12. The enhanced oil recovery process as claimed in claim 7 wherein the step of injecting water in step (c) comprises injecting water for a particular time.

13. The enhanced oil recovery process as claimed in claim 7 wherein said initial injection part of the total amount of solvent is equal to between about 5 percent and about 50 percent of said total amount of solvent.

14. A solvent and water injection process for the enhanced recovery of oil from a natural underground, oil-bearing formation having one or more fluid injection wells and one or more petroleum production wells in communication therewith, the process comprising the steps of:
  (a) injecting into said formation, through said one or more injection wells and at a first, average solvent-injection rate, a fluid consisting essentially of an initial injection part of a total amount of solvent to be injected into the formation for the enhanced oil recovery of oil therefrom, said initial injection part of the total amount of solvent being equal to between about 5 percent and about 50 percent of said total amount of solvent;
  (b) subsequently injecting into the formation, through said one or more injection wells and at a second, average solvent-injection rate, the remainder of said total amount of solvent with water;
  (c) subsequently injecting water into the formation through said one or more injection wells; and
  (d) recovering oil from said one or more production wells.

15. The enhanced oil recovery process as claimed in claim 14 wherein the solvent is selected from the group consisting of carbon dioxide, liquified petroleum gas, liquified natural gas, and mixtures thereof.

16. The enhanced oil recovery process as claimed in claim 14 wherein the solvent consists essentially of carbon dioxide.

17. The enhanced oil recovery process as claimed in claim 14 wherein the second, average solvent-injection rate is substantially less than said first, average solvent-injection rate.

18. The enhanced oil recovery process as claimed in claim 14 wherein the step of injecting the remainder of solvent with water in step (b) comprises injecting the remainder of the solvent and water in a water-alternating-gas (WAG) injection process.

19. The enhanced oil recovery process as claimed in claim 14 wherein the step of injecting water in step (c) comprises injecting water until a mixture of water and oil is produced from said one or more production wells in step (d) and until or after the concentration of water in said mixture of oil and water reaches a particular level.

20. The enhanced oil recovery process as claimed in claim 14 wherein the step of injecting water in step (c) comprises injecting water for a particular time.

21. A solvent and water injection process for the enhanced recovery of oil from a natural underground, oil-bearing formation having one or more fluid injection wells and one or more petroleum production wells in communication therewith, the process comprising the preliminary steps of:
 (i) deriving, for a total amount of solvent, a relationship between projected rates of oil recovery as a function of different initial injection parts of the total amount of solvent for injection into said formation; and
 (ii) determining from said derived relationship a particular, initial injection part of said total amount of solvent to be injected into said formation which is projected to provide a greater oil production than is projected to be provided either by initial injection of the total amount of solvent or subsequent injection of the total amount of solvent with water;
said process further comprising the steps of:
 (a) injecting into said formation, through said one or more injection wells and at a first, average solvent-injection rate, a fluid consisting essentially of the initial injection part of the total amount of solvent to be injected into the formation for the enhanced oil recovery of oil therefrom;
 (b) subsequently injecting into the formation, through said one or more injection wells and at a second, average solvent-injection rate, the remainder of said total amount of solvent with water;
 (c) subsequently injecting water into the formation through said one or more injection wells; and
 (d) recovering oil from said one or more production wells.

22. The enhanced oil recovery process as claimed in claim 10 wherein the step of determining, from said derived relationship, a particular part of the total amount of solvent in step (ii) comprises determining a peak region of said relationship in which the greatest amount of oil is projected to be recovered and selecting the particular part of the solvent from said peak region for injection in step (a).

23. The enhanced oil recovery process as claimed in claim 21 wherein the solvent is selected from the group consisting of carbon dioxide, liquified petroleum gas, liquified natural gas, and mixtures thereof.

24. The enhanced oil recovery process as claimed in claim 21 wherein the solvent consists essentially of carbon dioxide.

25. The enhanced oil recovery process as claimed in claim 21 wherein the second, average solvent-injection rate is substantially less than said first, average solvent-injection rate.

26. The enhanced oil recovery process as claimed in claim 21 wherein the step of injecting the remainder of solvent with water in step (b) comprises injecting the remainder of the solvent and water in a water-alternating-gas (WAG) injection process.

27. The enhanced oil recovery process as claimed in claim 21 wherein the step of injecting water in step (c) comprises injecting water until a mixture of water and oil is produced from said one or more production wells in step (d) and until or after the concentration of water in said mixture of oil and water reaches a particular level.

28. The enhanced oil recovery process as claimed in claim 21 wherein the step of injecting water in step (c) comprises injecting water for a particular time.

29. The enhanced oil recovery process as claimed in claim 21 wherein said initial injection part of the total amount of solvent is equal to between about 5 percent and about 50 percent of said total amount of solvent.

30. A carbon dioxide and water injection process for the enhanced recovery of oil from a natural underground, oil-bearing formation having one or more fluid injection wells and one or more petroleum production wells in communication therewith, the process comprising the steps of:
 (a) selecting a total amount of carbon dioxide to be injected into said formation for the enhanced recovery of oil therefrom;
 (b) injecting into said formation, through said one or more injection wells at a first, average carbon dioxide injection rate, a fluid which consists essentially of part of said total amount of carbon dioxide;
 (c) subsequently injecting into the formation, through said one or more injection wells at a second, average carbon dioxide injection rate which is less than said first, average injection rate, the remainder of said total amount of carbon dioxide with water;
 (d) subsequently injecting into the formation, through said one or more fluid injection wells, a fluid which consists essentially of water; and
 (e) producing oil from said one or more production wells.

31. The enhanced oil recovery process as claimed in claim 30 wherein the step of injecting the remainder of the carbon dioxide with water in step (c) comprises injecting the remainder of the carbon dioxide with water in a water-alternating-gas (WAG) injection process.

32. The enhanced oil recovery process as claimed in claim 31 wherein the carbon dioxide and water are injected simultaneously.

33. The enhanced oil recovery process as claimed in claim 32 wherein the carbon dioxide and water are injected at substantially the same rates.

34. The enhanced oil recovery process as claimed in claim 30 wherein the step of injecting essentially water in step (d) comprises injecting water into the formation until after a mixture of oil and water is produced from said one or more production wells in step (e) and until or after the concentration of water in said mixture of oil and water reaches a particular limit.

35. The enhanced oil recovery process as claimed in claim 30 wherein said initial injection part of the total amount of carbon dioxide injected in step (b) is between about 5 percent and about 50 percent of said total amount of carbon dioxide.

36. The enhanced oil recovery process as claimed in claim 30 including the additional, preliminary steps of:
  (i) deriving, for said total amount of carbon dioxide, a relationship between projected oil recovery rates and different initial injection parts of the total amount of carbon dioxide; and
  (ii) selecting from said desired relationship a particular initial injection part of said total amount of carbon dioxide.

37. The enhanced oil recovery process as claimed in claim 36 wherein the step of determining from said derived relationship a particular part of the total amount of carbon dioxide in step (i) comprises determining a peak region of said relationship in which the projected oil recovery is greater than that projected to be provided either by injecting the total amount of carbon dioxide in step (b) or, with water, in step (c), and wherein the step of selecting a particular initial injection part of the total amount of carbon dioxide in step (ii) includes selecting said particular initial injection part from said peak region.

38. A three-stage solvent and water injection process for the enhanced recovery of petroleum oil from a crude oil-bearing formation having one or more injection wells and one or more production wells in communication therewith, the enhanced recovery process comprising the steps of:
  (a) selecting a total amount of solvent to be injected during said three injection stages into said formation through said one or more injection wells;
  (b) deriving, for said selected total amount of solvent to be injected into said formation, a relationship between different first injection stage amounts of solvent injection and corresponding projected incremental oil recovery rates;
  (c) selecting from said relationship an initial injection amount of solvent to be injected into said formation during a first injection stage;
  (d) injecting into said formation, through said one or more injection wells in a first of said three injection stages, said selected initial amount of solvent, essentially by itself;
  (e) injecting into said formation, through said one or more injection wells in a second of said three injection stages, the remainder of the total amount of solvent with water in a water-alternating-gas (WAG) injection process;
  (f) injecting into the formation, through said one or more injection wells in a third of said three injection stages, a fluid consisting essentially of water; and
  (g) producing oil from said one or more production wells.

39. The enhanced oil production process as claimed in claim 38 wherein the step of selecting the initial injection part of the total amount of solvent in step (c) comprises selecting an amount of solvent which is equal to less than about 50 percent of said total amount of solvent.

40. The enhanced oil recovery process as claimed in claim 38 wherein the total amount of solvent is selected to be between about 20 percent and about 50 percent of the pore volume of the formation.

41. The enhanced oil recovery process as claimed in claim 38 wherein the step of injecting the remainder of the solvent with water in the water-alternating-gas process of step (e) comprises injecting substantially equal amounts of solvent and water, and wherein the solvent is injected in step (e) at an average solvent injection rate which is substantially less than the average rate at which solvent is injected in the first injection stage of step (d).

42. The enhanced oil recovery process as claimed in claim 38 wherein the step of injecting water into the formation in the third injection stage of step (f) comprises injecting water until after a mixture of oil and water is produced from the production wells in step (g) and until or after the concentration of water in said mixture reaches a level of at least about 90 percent.

43. The enhanced oil recovery process as claimed in claim 38 wherein said relationship derived in step (b) has a peak region and wherein the step of selecting an initial injection amount of solvent in step (c) includes selecting the initial injection amount of solvent from said peak region.

44. The enhanced oil recovery process as claimed in claim 38 wherein the solvent is selected from the group consisting of: carbon dioxide, liquified petroleum gas, liquified natural gas, and mixtures thereof.

45. The enhanced oil recovery process as claimed in claim 38 wherein the selected solvent consists essentially of carbon dioxide.

46. A three-stage carbon dioxide and water injection process for the enhanced recovery of petroleum oil from a oil-bearing formation having one or more injection wells and one or more production wells in communication therewith, the enhanced recovery process comprising the steps of:
  (a) selecting a total amount of carbon dioxide, part of which is to be injected into said formation through said one or more injection wells essentially by itself in a first, solvent injection stage; and the remainder of which is to be subsequently injected, with water, in a water-alternating-gas (WAG), second, solvent injection stage, said total amount of carbon dioxide being less than about 50 percent of the formation pore volume;
  (b) deriving, for said selected total amount of carbon dioxide to be injected into said formation, a relationship between different amounts of carbon dioxide to be injected in said first, solvent injection stage as parts of said total amount of carbon dioxide and corresponding projected incremental oil recovery rates;
  (c) selecting from said relationship, for injecting in said first injection stage, a particular initial injection part of the total amount of carbon dioxide which provides a projected, enhanced oil production rate greater than the incremental oil production rate projected to be provided either by injecting all of the total amount of carbon dioxide in said first, solvent injection stage or all of said total amount of solvent in said second, solvent injection stage, said selected particular initial injection part of the total amount of carbon dioxide being less than about one half of the total amount of carbon dioxide;
  (d) injecting, in the first solvent injection stage, said initial injection part of the total amount of carbon dioxide into said formation through said one or more injection wells;
  (e) injecting, in the second injection stage, the remainder of the total amount of carbon dioxide, with water, in a water-alternating-gas (WAG) injection process, into the formation through said one or more injection wells;

(f) injecting, in a third injection stage, a fluid consisting essentially of water into the formation through said one or more injection wells; and (g) producing oil from the one or more production wells until or after a mixture of water and oil is produced from the one or more production wells and the concentration of water in said mixture reaches a level of at least about 90 percent.

47. The enhanced oil recovery process as claimed in claim 46 wherein the step of selecting a total amount of carbon dioxide in step (a) comprises selecting an amount of carbon dioxide which is equal to between about 10 and about 50 percent of the pore volume of said formation.

48. The process as claimed in claim 46 wherein the step of selecting an initial amount of carbon dioxide in step (c) comprises selecting an initial amount of carbon dioxide which is equal to about one-third of said total amount of carbon dioxide.

49. A solvent and water injection process for the enhanced recovery of oil from a natural underground, oil-bearing formation, there being one or more fluid injection wells and one or more petroleum production wells, the process comprising the steps of:
(a) injecting a fluid consisting essentially of one or more solvents into said formation through said one or more injection wells;
(b) subsequently injecting into said formation through said one or more injection wells a series of alternate slugs of solvent and water, the average mass flow rate of said solvent into the formation being lower than the average mass flow rate of solvent in step (a), with the total amount of solvent introduced by said series being between about 50 and about 95 percent of the total solvent injected in steps (a) and (b);
(c) subsequently injecting a fluid consisting essentially of water into the formation through one or more of said injection wells; and
(d) recovering oil from said one or more production wells.

50. The enhanced oil recovery process as claimed in claim 49 wherein the amount of solvent introduced during step (b) is between about 67 and about 83 percent of the total amount of solvent introduced during both steps (a) and (b).

51. A solvent and water injection process for the enhanced recovery of oil from a natural underground, oil-bearing formation, there being one or more fluid injection wells and one or more petroleum production wells, the process comprising the steps of:
(a) injecting a fluid consisting essentially of one or more solvents into said formation through said one or more injection wells;
(b) subsequently and simultaneously injecting into said formation through said one or more injection wells both solvent and water, the average mass flow rate of said solvent into the formation being lower than the average mass flow rate of solvent in step (a), with the total amount of solvent introduced by said series being between about 50 and about 95 percent of the total amount of solvent injected in both steps (a) and (b);
(c) subsequently injecting a fluid consisting essentially of water into the formation through one or more of said injection wells; and
(d) recovering oil from said one or more production wells.

52. The enhanced oil production process as claimed in claim 51 wherein the amount of solvent introduced during step (b) is between about 67 and about 83 percent of the total amount of solvent introduced during both steps (a) and (b).

53. A solvent and water injection process for the enhanced recovery of oil from a natural underground, oil-bearing formation, there being one or more fluid injection wells and one or more petroleum production wells comprising the steps of:
(a) injecting a fluid consisting essentially of one or more solvents into said formation through said one or more injection wells, the amount of said fluid so injected being equivalent to between about 0.03 and 0.15 of the pore volume of the formation;
(b) subsequently injecting into said formation through said one or more injection wells a series of alternate slugs of solvent and water, the average mass flow rate of said solvent into the formation being lower than the average mass flow rate of solvent in step (a), with the total amount of solvent introduced in both steps (a) and (b) being equivalent to between about 0.1 and about 0.3 of the pore volume of the formation;
(c) subsequently injecting a fluid consisting essentially of water into the formation through one or more of said injection wells; and
(d) recovering oil from said one or more production wells.

54. The enhanced oil recovery process as claimed in claim 53 wherein the amount of solvent introduced during step (a) is equivalent to between about 0.05 and about 0.10 of the pore volume of the formation.

55. A solvent and water injection process for the enhanced recovery of oil from a natural underground, oil-bearing formation, there being one or more fluid injection wells and one or more petroleum production wells comprising the steps of:
(a) injecting a fluid consisting essentially of one or more solvents into said formation through said one or more injection wells, the amount of said fluid so injected being equivalent to a value between about 0.03 and about 0.15 of the pore volume of the formation;
(b) subsequently and simultaneously injecting into said formation through said one or more injection wells both solvent and water, the average mass flow rate of said solvent into the formation being lower than the average mass flow rate of solvent in step (a), with the total amount of solvent introduced in both steps (a) and (b) being equivalent to a value between about 0.1 and about 0.3 of the pore volume of the formation;
(c) subsequently injecting a fluid consisting essentially of water into the formation through one or more of said injection wells; and
(d) recovering oil from said one or more production wells.

56. The enhanced oil recovery process as claimed in claim 55 wherein the amount of solvent introduced during step (a) is equivalent to between about 0.05 and about 0.10 of the pore volume of the formation.

57. The enhanced oil recovery process as claimed in claim 55 wherein the water injection in step (c) is terminated during the time the oil recovered from said one or more petroleum production wells in step (d) contains water at a concentration at or above about 75 percent.

58. The enhanced oil recovery process claimed in claim 55 wherein the water injection in step (c) is terminated during the time the oil recovered from said one or more petroleum production wells in step (d) contains water at a concentration at or above about 90 percent.

* * * * *

UNITED STATES PATENT AND TRADEMARK OFFICE
CERTIFICATE OF CORRECTION

PATENT NO. : 4,848,466
DATED : July 18, 1989
INVENTOR(S) : Eugene C. Lin

It is certified that error appears in the above-identified patent and that said Letters Patent is hereby corrected as shown below:

Column 13, line 53, change "10" to --21--.

Column 14, line 31, after "formation" change the semicolon to a comma.

Column 15, line 7, change "desired" to --derived--.

Signed and Sealed this

Ninth Day of April, 1991

Attest:

HARRY F. MANBECK, JR.

Attesting Officer

Commissioner of Patents and Trademarks